Jan. 27, 1959   C. A. RAFFERTY   2,871,436
DIRECTIONAL CONTROL SERVOSYSTEM
Filed April 21, 1955
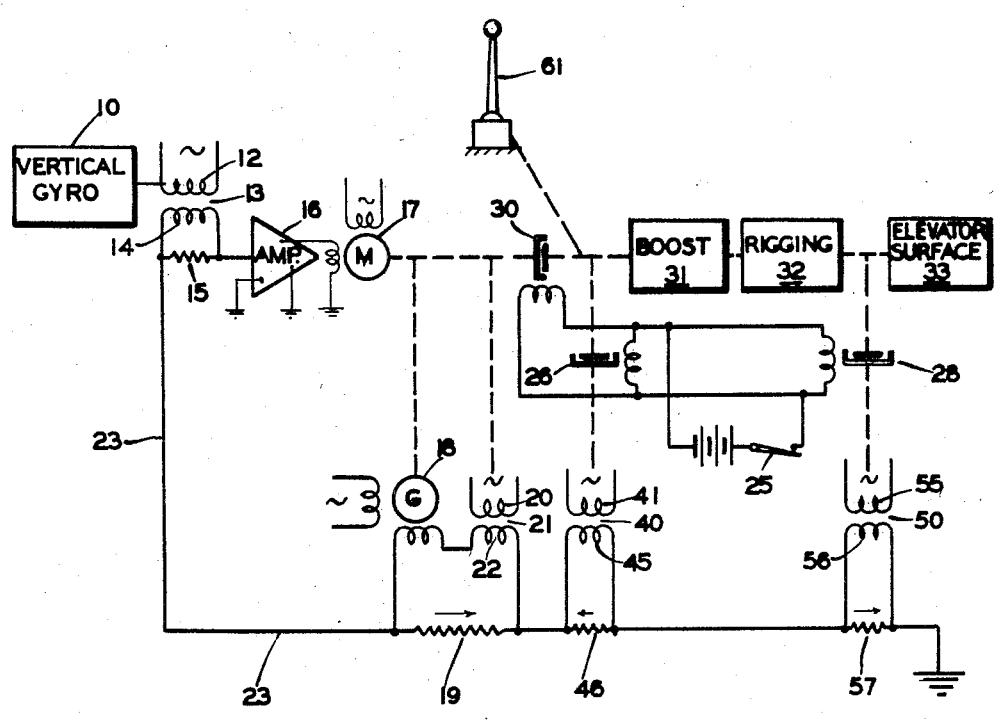
INVENTOR.
CHRISTOPHER A. RAFFERTY
BY
Oscar B Brumback
ATTORNEY United States Patent Office 2,871,436
Patented Jan. 27, 1959

2,871,436

DIRECTIONAL CONTROL SERVOSYSTEM

Christopher A. Rafferty, Brooklyn, N. Y., assignor to Bendix Aviation Corporation, Teterboro, N. J., a corporation of Delaware Application April 21, 1955, Serial No. 502,820

8 Claims. (Cl. 318—489)

This invention relates generally to control systems and, more particularly, to control systems for aircraft wherein the control system is selectively engageable and disengageable for automatic and manual control of the craft.

Automatic control systems for aircraft generally detect deviations of the craft from a reference and apply a corrective action to the craft to return it to reference. If this corrective action be applied through a boost system and linkage to the rigging for the control surface, the action may not be proportional to the deviation; and the frictional engagement of the parts may be such that small deviations are not registered as actual displacements of the control surface.

In any servo-control system it is usual to provide a "follow-up" or "negative feedback" arrangement whereby a signal corresponding to the displacements of the servo-motor or the controlled object is reintroduced into the signal chain feeding the servo-motor, along with the original control signal but in opposition thereto. Such a measure is essential in order to ensure stability of the control and approximate proportionality between the controlling effects and the resulting displacements of the controlled object.

The present invention is based on the finding that under certain circumstances the operation of a servo-control system is considerably and unexpectedly improved by including in the signal chain feeding the servo-motor, in addition to the conventional negative feedback or follow-up signal, further a positive feedback signal, i. e., a signal corresponding to the displacement of the controlled object, but introduced into the signal chain so as to add to the initial control signal and, hence, subtract from the negative feedback signal. By thus introducing a certain positive or regenerative feedback effect, of carefully adjusted relative amplitude, it has been found possible to improve the operation of servo-systems, especially in cases where the mechanical load assembly driven by the servo-motor is of such character as to develop a substantial amount of non-linear parasitical effects such as friction, blacklash, "dead spots," etc., which tend to disturb the accurate proportionality relationship between the displacements of the controlled object and the controlling effect.

This advantage of a positive feedback effect is especially apparent in cases involving a servo system such as an aircraft automatic pilot, wherein, on the one hand, there exists a relatively long and intricate kinematic chain of components between the servo-motor and the control surface controlled by it (including linkage, cables, and other intermediate components liable to introduce the abovementioned parasitic effects) and wherein, on the other hand, provision must exist for disconnecting the control surface from the servo-motor for permitting manual control of the surface.

Because of the long kinematic chain just mentioned, it is evident that in order to secure optimum proportionality between the control surface displacements and the control signals (such as directional, roll or pitch displacement signals), it is necessary for the conventional negative feedback signal to be a measure of the actual displacements of the control surface, rather than a measure of the servo-motor displacements, since the two kinds of displacements are not identical owing to the parasitic effects mentioned above, such as friction and lost motion in the linkages and cables. Thus, it would be desirable for the negative feedback signal to be developed by a signal generator driven directly by the control surface (or other controlled object) rather than by the servo-motor.

But on the other hand, owing to the possibility of disconnecting the controlled object from the servo-motor, another and equally important consideration arises which is in favor of driving the negative feedback signal generator directly from the servo-motor. The reason is that, even during the periods where the control surface is disconnected from the servo-motor and is being manually operated, the reference signal serving to stabilize the aircraft during automatic control is still present and continues to drive the servo-motor whenever the craft happens to be displaced from its reference condition. Should there be no negative feedback or follow-up effect provided at such a time, the reference signal will not tend to be balanced by a follow-up signal and there will be a persistent electrical unbalance in the control circuit. Should the aviator wish to revert to automatic control during such a period, i. e., with the craft displaced from reference, the unbalanced reference signal will cause the servo-motor to apply a violent force to the control surface as the coupling between it and the motor is reengaged, and this may dangerously unbalance the aircraft. In such cases, therefore, it would be desirable so to arrange matters that the negative feedback signal will be continuously present even during the periods in which the control surface is disengaged, so as to provide for a continual balancing of the reference signal whereby the resulting error signal applied to the servo-motor will at all times be tending towards zero. In other words, this would require that the negative feedback signal generator be directly driven from the servo-motor. This feature is sometimes known as "synchronization" and is adopted on many types of present day automatic pilots. It will be seen that the synchronization requirement conflicts with the proportionality requirement previously noted.

As will be presently explained, this invention makes it possible to reconcile both these apparently conflicting requirements and to achieve an accurate proportionality between the control surface deflection and the magnitude of the control effect (such as a directional, roll or pitch reference signal) applied to the servo-motor, while at the same time retaining the "synchronization" feature making for a safe transition from manual to automatic piloting at any time.

Thus, in the first place, the invention provides that improvement in servo-control systems, which consists in generating, in addition to the conventional negative feedback signal introduced into the servo-motor in opposition to the control signal, a further positive feedback signal, introduced so as to add to the control signal.

In a preferred form of the invention, the said improvement is applied to a servo-control system (such as an aircraft automatic pilot) of the type wherein the controlled object (such as an aircraft control surface) is disconnectable from its servo-motor, and there is then provided a first negative feedback signal derived from the servo-motor before the disconnecting means, a further negative feedback signal derived from the controlled object, and said positive feedback signal is derived immediately beyond the disconnecting means, so that it will normally cancel the first negative feedback signal when the connecting means are engaged, and the only negative feedback signal then present will be the second negative feedback signal which corresponds to the effective displacements of the controlled object and will therefore ensure proportionality regardless of any non-linear parasitic effects such as friction and lost motion in the transmission between the disconnecting means and the controlled object.

Thus, it is seen that the preferred form of the invention just specified succeeds in reconciling the conflicting requirements of synchronization and proportionality despite the presence of non-linear effects in the transmission between the servo-motor and the controlled object.

An object of the present invention, therefore, is to provide a novel means for applying to a craft surface a corrective action proportional to the deviation of the craft from reference.

Another object is to provide a novel automatic pilot system for aircraft which will control the extent of surface movement, rather than control a boost or linkage and be dependent upon the operation of the boost and associated linkages and cables for controlling the extent of surface movement.

A further object is to provide an automatic control system for an aircraft with a novel provision for supplying a positive feed back to the servomotor to overcome the friction and "dead spots" of the boost and rigging, yet permit the followup position transmitter to determine the final position of the surface.

Still another object is to provide a novel means for maintaining the automatic control system synchronized with the attitude of the craft during manual control of the craft when the automatic control system is disconnected from the surface of the craft and for providing a follow up action upon engagement of the automatic control with the surface so that the extent of displacement of the surface from normal position will correspond to the extent of deviation of the craft from reference.

The present invention contemplates an automatic control system for an aircraft whose control surface is selectively connected with and disconnected from the servomotor of the system and wherein the servomotor operates in response to a summation of signals corresponding to displacement of the craft from reference, and corresponding to the rate and extent of motor operation when the servomotor is disconnected from the surface so as to maintain the signal chain in a balanced condition and in which provision is made between the surface and the connecting and disconnecting means for developing a signal for cancelling the extent of motor operation signal when the servomotor is connected with the surface and in which further provision is made for developing a signal corresponding to the extent of displacement of the surface from normal position.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single figure of the drawing illustrates schematically an embodiment of a single channel for control of an automatic control system in accordance with the present invention.

The automatic control system for an aircraft generally comprises pitch, roll, and yaw control channels. For purposes of clarity, only the elevator channel of the automatic pilot system is illustrated. However, it should be recognized that the same principles will apply to the channels and that other equipment (not shown) may be included in the same channel.

Turning to the drawing, the attitude reference is provided by a vertical gyro 10 which is connected in a known manner with the rotor 12 of an inductive device 13 so that displacement of the craft in pitch relatively displaces rotor 12 and stator 14 to develop at resistor 15 a signal whose amplitude and phase depend upon the extent and direction of displacement of the craft from the predetermined attitude. This signal is applied to an amplifier 16 whose resulting output is applied across a control winding of an induction motor 17 which may be of a conventional two phase type. The signal applied across the control winding of motor 17 may in a conventional manner effect rotation of the motor 17 in a clockwise or counter-clockwise direction depending upon the phase of the controlling signal. Amplifier 16 may be generally similar to that described in U. S. Patent No. 2,625,348 issued January 13, 1953 to Noxon et al.

The operation of motor 17 turns the rotor of a conventional rate generator 18 to develop across resistor 19 a signal corresponding in amplitude and phase to the rate and direction of motor operation and acting in opposition to the control signal applied across resistor 15. The motor 17 also displaces the rotor 20 of an inductive device 21 relative to stator 22 to develop across resistor 19 another signal corresponding in amplitude and phase to the extent and direction of motor operation and acting in opposition to the control signal applied across resistor 15. By way of lead 23, these signals are combined with the signal from vertical gyro 10 to provide a net signal input to amplifier 16. Motor 17 actuates a boost 31 when switch 25 is closed so that clutches 26, 28 and 30 are engaged, and boost 31, in turn, through rigging 32 operates the elevator surface 33 to control the pitch attitude of the craft.

A normally centered inductive device 40 is connected between clutch 30 and boost 31 so that rotor 41 is displaced by the motor operation when clutches 30 and 26 are energized. The signal developed by stator 45 across resistor 46 is opposed in phase to the signal developed by stator 22 across resistor 19. Stator 22 is to provide a negative feed back so stator 45, therefore, provides positive feed back.

Another normally centered inductive device 50 is connected by way of a suitable mechanical linkage and clutch 28 to surface 33. When clutch 28 is engaged, any displacement of surface 33 thereafter relatively displaces rotor 55 and stator 56 to develop across resistor 57 a signal corresponding in amplitude and phase to the extent and direction of this displacement. This signal is so phased to provide a negative feed back. Thus, the signal from stators 22 and 56 are in phase and the signal from stator 45 is 180 degrees out of phase. These signals are summed, resistors 57, 46, 19 and 15 being connected in series to amplifier 16.

When switch 25 is in the open position shown, the human pilot controls the attitude of the craft by operating boost 31 with manual controller 61 to displace control surface 33. If the craft is not at the predetermined attitude during the manual control, the signal developed by inductive device 13 is applied through amplifier 16 to motor 17 which operates until the relative displacement of rotor 20 and stator 22 of inductive device 21 develops a signal equal and opposite to the signal from inductive device 13. The net input to amplifier 16 at this time is zero and motor 17 stops. The feedback signal developed across resistor 19 by rate generator 18 damps the motor operation. The input to amplifier 16 is thus maintained at zero, and switch 25 may be closed at any time to engage clutch 30 and smoothly connect motor 17 with boost 31.

When clutch 30 is engaged, clutches 26 and 28 are also engaged. Thereafter any displacement of the craft in pitch displaces the rotor 12 of inductive device 13 to develop a corresponding attitude displacement signal which operates motor 17 to displace surface 33 in a direction to return the craft to the engaged attitude. The operation of the motor displaces rotor 20 relative to stator 22 and displaces rotor 41 relative to stator 45; and the operation of the surface displaces rotor 55 relative to stator 56. The signals from inductive devices 21 and 50 are so connected to oppose the attitude displacement signal and the signal from inductive device 40 is so connected to add to the attitude displacement signal.

In operation, upon switching from manual to automatic control, the signals across stators 22 and 45 initially cancel when clutch 30 is engaged. Thus, the displacement of surface 33 by the motor and stator 56 of inductive device 50 due to the relative displacement of rotor 55 builds up across resistor 57 a signal corresponding in amplitude and phase to the extent and direction of the displacement of the control surface. When this signal builds up to oppose the displacement signal from inductive device 13, the net input signal to amplifier 16 is zero and motor 17 stops with surface 33 displaced by an amount to return the craft to its engaged attitude.

As the displaced surface returns the craft to the engaged attitude, the signal from inductive device 13 decreases and the signal from inductive device 50 prevails to return the surface to its normal position. The signals across stators 45 and 22 again cancel each other. As the craft reaches the reference attitude, the net input signal to amplifier 16 is zero.

It will be apparent that if the system contains appreciable friction or "dead spots" due to boost and rigging, inductive device 40 may be designed to develop a slightly greater output than inductive device 21 so as to provide a slight positive feed back. The positive feed back will provide an additional signal to operate the servomotor to overcome the friction yet allow follow up device 50 to determine the final position of surface 33.

The foregoing has presented a novel automatic control system for a craft which may be selectively controlled manually and automatically. During manual control, the automatic control system is preconditioned to take over control smoothly at any instant; and during automatic control the extent of displacement of the control surface corresponds to the extent of the displacement of the craft from a reference attitude and positive feed back may be provided in the event the rigging and boost system contain appreciable friction or "dead spots" to overcome the adverse conditions.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. A control system for a member which is movable from a reference position to control a condition, comprising power means, means for transmitting motion from said power means to said movable member, first means responsive to operation of said power means for developing a first signal, second means responsive to deviation of the value of said condition from a normal value for developing a second signal, means for transmitting said first and second signals to said power means in opposing relation so that a resultant signal is provided to operate said power means in a sense to reduce said difference to zero, selection means operable in a first manner and a second manner for rendering said power means effective and ineffective for moving said member through said motion transmitting means, third means interposed between said motion transmitting means and said member and operable by said power means when said selection means is operated in said first manner for developing a thirid signal corresponding to the extent of movement imparted through said motion transmitting means by said power means, fourth means responsive to the movement of said member from a normal position for developing a fourth signal acting in opposition to said third signal, means additionally transmitting said third and fourth signals to said power means in opposing relation, said third means being operated by the power means after said selection means is operated in said first manner so as to develop a third signal in opposition to and sufficiently greater than the first signal developed by said first means as to effect a resultant signal, said last mentioned resultant signal tending to cause the power means to actuate the movable member through the motion transmitting means so as to compensate for loss of motion therein and provide an accurate proportionality relationship between the displacement of said movable member and the controlling condition, and said second and fourth signals acting in opposing relation whereby the resultant of said fourth and second signals controls the sense of operation of said power means.

2. A system for moving the surface of a craft, comprising a first signal device, means responsive to deviation of the craft from a reference position for actuating said first signal device for developing a corresponding first signal, a second signal device for developing a second signal opposing said first signal, power means responsive to the difference between said first and second signals for actuating said second signal device to develop said second signal for reducing said difference to zero, means for connecting said power means with said surface for moving the latter, a third signal device, means operable after said power means and surface are connected for actuating said third signal device to develop a third signal corresponding to the extent of actuation, said third signal being in opposition to and sufficiently greater than the second signal as to effect a resultant signal tending to cause the power means to move the surface through the connecting means so as to compensate for loss of motion in the connecting means, a fourth signal device, means responsive to the movement of said surface for actuating said fourth signal device so as to develop a signal corresponding to the extent of movement of said surface, and means transmitting said signals to said power means so that the signals from said second and third devices are in opposed relation and the signals from said first and fourth devices are in opposed relation to provide a resultant signal for operating said power means.

3. A control system for an aircraft having a movable surface, comprising means for developing a signal corresponding to the extent of deviation of the craft from reference, a motor operable by said signal, second means for developing a second signal corresponding to the extent of motor operation to oppose said first signal, whereby said motor operation stops when said signals become equal and opposite, means for connecting said motor and said surface including means operable after said connection for developing a third signal corresponding to the subsequent motor operation to oppose said second signal, said third signal being sufficiently greater than said second signal as to tend to cause said motor to move the surface through said connecting means so as to compensate for loss of motion therein, and means operable in response to the movement of said surface by said motor for developing a fourth signal to oppose the said first signal.

4. A control system for a craft whose movable surface is selectively operable manually and automatically, comprising power means, motion transmitting means to operatively connect the power means to the movable surface, said motion transmitting means including clutch means for engaging said power means and said surface for automatically operating the latter and for disengaging said power means from said surface for manually operating the latter, reference means for developing a control signal of variable magnitude for said power means, first follow up means for developing a signal whose magnitude corresponds to the extent of operation of said power means, second follow up means operable when said power means and surface are engaged for developing a signal after said engagement in opposition to and sufficiently greater than the signal of said first follow up means as to tend to cause said power means to operate the surface through the motion transmitting means in such a manner as to compensate for loss of motion in said motion transmitting means, third follow up means operatively connected with said surface for developing a signal whose magnitude corresponds to the extent of movement of said surface from a reference position, and means connecting said signals to said power means so that said first and third mentioned signals are in aiding relation and are opposed by said second and fourth mentioned signals.

5. A control system for a craft having a displaceable surface, comprising first control means responsive to deviation of said craft from a reference for developing a corresponding signal, second control means responsive to displacement of said surface from a normal position for developing a corresponding signal, means for combining said signals in opposed relationship to provide a resultant signal, power means operable in response to said resultant signal, rigging connecting said power means with said surface and operable by said power means for displacing said surface, means for selectively rendering said power means effective and ineffective to operate said rigging, first follow up means for developing a signal corresponding to the extent of operation of said power means, said last named signal tending to cancel said first mentioned signal when said power means is not effective to displace said surface, and second follow up means for developing a signal corresponding to the extent of operation of said rigging by said motor, the signal of the second follow up means tending to cancel the signal of said first follow up means when said power means is rendered effective to operate said rigging to displace said surface, whereupon said power means is operatively controlled by said first and second control means.

6. In an aircraft having a control surface movable through a power boost arrangement, an automatic control system comprising reference means for detecting deviation of said craft from datum for operation of said system, first follow up means for detecting operation of said control system, said reference and first follow up means being connected in opposed relation whereby said system operation is proportional in extent to said deviation, second follow up means for detecting the movement of said surface, said reference and second follow-up means being connected in opposed relation, and means connecting said system with said boost arrangement, said surface being subject to movement not proportional to the operation of said control system due to characteristics of said boost arrangement, and said connecting means including third follow-up means for detecting operation of said control system through said connecting means, said third follow-up means acting in opposition to said first follow-up means for rendering said first follow up means ineffective on said control system whereby said control system operates in response to the deviation until said surface is moved to an extent as detected by said second follow-up means proportional to said deviation.

7. In a control system for an aircraft having a movable surface, reference means for developing a control signal corresponding to the displacement of the craft from reference, power means under the control of said signal, means operatively connecting said power means to said surface, said connecting means including a movable input means and a movable output means for moving said surface, means operatively connected to said input means for providing a positive feed back signal for said power means to compensate for frictional losses in said connecting means, and means operatively connected to said output means for providing a negative feed back signal for said power means responsive to the displacement of the movable surface.

8. In an aircraft having a control surface movable through a power boost arrangement, an automatic control system having reference means for detecting deviation of said craft from datum for operation of said system and first follow up means for opposing the operation of said control system, whereby said operation is proportional in extent to said deviation, means connecting said automatic control system with said boost arrangement, second follow up means for measuring the extent of surface movement, said surface being subject to movement not in proportion to the operation of said control system due to characteristics of said boost arrangement, said connecting means including means for developing an effect equal and opposite to said first follow up means, whereby said first follow up means is made ineffective on said control system and said second follow up means is made effective on said system so that the operation of said system in response to the deviation moves said surface to an extent proportional to said deviation.

References Cited in the file of this patent

UNITED STATES PATENTS

| | | |
|---|---|---|
| 2,589,834 | MacCallum | Mar. 18, 1952 |
| 2,666,177 | Brannien | Jan. 12, 1954 |
| 2,740,082 | Sedgfield | Mar. 27, 1956 |